Figure 1:
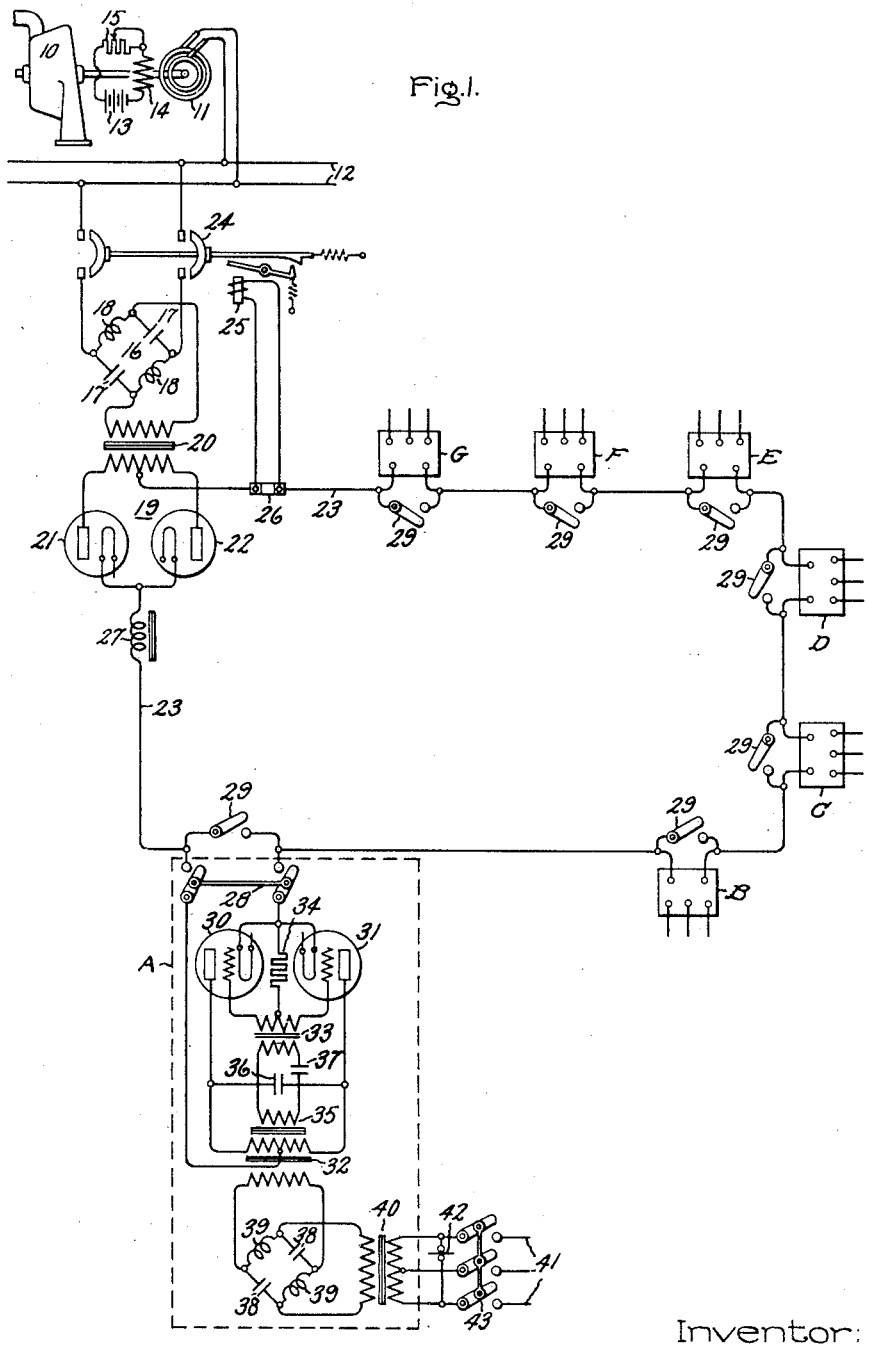

Feb. 12, 1935. C. W. STONE 1,990,758
ELECTRIC POWER TRANSMISSION AND DISTRIBUTION
Filed May 9, 1934 2 Sheets-Sheet 1

Inventor:
Charles W. Stone,
by Harry E. Dunham
His Attorney.

Patented Feb. 12, 1935

1,990,758

UNITED STATES PATENT OFFICE 1,990,758

ELECTRIC POWER TRANSMISSION AND DISTRIBUTION

Charles W. Stone, Schenectady, N. Y., assignor to General Electric Company, a corporation of New York Application May 9, 1934, Serial No. 724,705

19 Claims. (Cl. 171—97)

My invention relates to electric power transmission and distribution systems and more particularly to the transmission and distribution of electric power with direct current.

The use of direct current for the transmission of power is attended by a number of basic advantages over the alternating current system. These advantages have been frequently reported in the technical press and include simplicity in line equipment, economy in copper, relatively simple insulation conditions, reduced losses, lack of major inductive and capacitive reactance phenomena and the non-existence of the stability problem. The engineering development of direct current transmission, however, has lagged far behind that of alternating current transmission. The latter has been steadily developed from very simple beginnings to its present state of excellence, while the former can number only a few European installations, such as those of René Thury and his successors. The Thury system has always labored under the handicap of the necessity of rotating machines with mechanical commutators at both the generating and receiving stations.

It has been proposed heretofore to transmit electric power by means of a high voltage, direct current system in which electric valves are used as rectifiers for the production of high-voltage direct current and as inverters for the reconversion of the direct current into alternating current, thereby eliminating rotating machines in the conversion stations. It has been the general consensus of opinion heretofore among prior investigators that direct current could only be used with advantage for the transmission of power in bulk at constant voltage and at very high voltages of the order of 300,000 volts.

There is an important problem in the transmission and distribution of electric power which has not been heretofore satisfactorily solved and that is the problem of supplying electric service to farmers, rural residents and sparsely settled communities. Recent statistics reveal that in the United States there are more than 50,000,000 people living in rural areas with some 30,000,000, or twenty-five per cent of the entire population of the United States living on farms. The farms supplied with electric service from electrical companies have increased from 2.6% in 1924 to only roughly 10% up to the present time. In other words, there is still a large percentage of the farms without electric service. Although some progress has been made in tapping high voltage alternating current lines for widely distributed small power users the methods proposed or employed have not received wide use and have not resulted in increasing to any material extent the percentage of rural communities served with electric service.

Another important problem in the transmission and distribution of electric power which has not been entirely satisfactorily solved by the alternating current system is the transmission of power in bulk from large sources of energy, particularly water power, located relatively great distances from a receiving circuit. The receiving circuit may be an independent load circuit, that is, a load circuit not connected to any other system, or it may be a receiving bus connected to an existing alternating current system. Although the alternating current system has reached a high state of development, there are many troublesome problems, such as the stability problem and other problems connected with synchronous machines and high voltage alternating current circuits which are not present with the direct current transmission system arranged and operated in accordance with my invention.

It is an object of my invention to provide an improved direct current system of transmitting electric power at constant current which will overcome many disadvantages of prior systems of this type and which will be simple, economical and reliable in operation.

It is another object of my invention to provide an improved system of electrical distribution suitable for supplying a number of widely distributed relatively small power consumers.

It is a further object of my invention to provide a new and improved system of direct current power transmission whereby farmers, rural residents and sparsely settled communities may be furnished with reliable electric service more cheaply than is possible with the systems now available.

It is a still further object of my invention to provide an improved arrangement for transmitting power from an alternating current source of constant voltage to a constant voltage alternating current receiving circuit by means of a direct current system at constant current with converting and inverting apparatus comprising electric discharge devices.

In accordance with one embodiment of my invention which is particularly suitable for widely distributed small power consumers I utilize any convenient source of constant voltage alternating current, transform this constant voltage alternating current to alternating current of constant value, rectify the constant value alternating current for transmission at direct current of constant value. The transmission circuit is to be operated as a series direct current system. One satisfactory arrangement consists in using a single conductor cable arranged in the form of an open loop with the respective outgoing and return conductors transversing the territory to be served and running as close to the respective customers as is possible without unduly increasing the cost of the direct current circuit. At or near each customer I provide individual tap-off stations comprising an inverter connected in series relation with the line for inverting the constant direct current into alternating current of constant value, and then transform the alternating current of constant value into constant voltage alternating current for energizing the relatively short distribution circuit to the consumers' buildings which for example, may be of the 120/240 volts, 60 cycle, single phase type, or 120/208 volt three phase, four wire type.

In accordance with another embodiment of my invention which is directed more particularly to the transmission of power in bulk from distant sources of energy to one or a few relatively large receiving stations, or an existing alternating current system, and which for purposes of distinguishing from the above mentioned embodiment of my invention I refer to as point-to-point transmission, I again utilize the constant direct current circuit between the supply and receiving stations. In this instance one group of rectifier tubes, which may be two-electrode vapor electric valves, are used to furnish, for example, 200 amperes constant direct current at 15,000 volts positive, with the negative terminal of the group grounded. A second group of similar rectifier tubes are used to furnish, for example, 200 amperes at 15,000 volts negative, with the positive terminal of the groups grounded and the negative terminal connected to the other side of the circuit. In other words I provide a plurality of groups of series connected rectifier units provided with a neutral connection to a neutral conductor or ground. The line may consist of a tower line with the ordinary ground wire for lighting protection and two single-conductor cables of a size determined by mechanical considerations. At the receiving station, the equipment will be similar to that installed at the supply station and similarly arranged with the exception that the tubes will be furnished with a control electrode or grid and connected for inverter operation. If the system is used to feed a load which is not connected to any other system, transforming apparatus such as the monocyclic square or a network of reactances of opposite sign is used to change the alternating current of constant value from the inverter to alternating current of constant voltage which may be changed to any convenient voltage for distribution purposes by a suitable transformer.

The novel features which I believe to be characteristic of my invention are set forth with particularity in the appended claims. The invention itself, however, will be better understood by reference to the following description taken in connection with the accompanying drawings in which Fig. 1 shows diagrammatically one embodiment of my invention which is particularly adapted for distributing power to a number of widely distributed relatively small power consumers, and Fig. 2 shows diagrammatically another embodiment of my invention which is particularly adapted for point-to-point transmission to an independent receiving station.

Figure 2:
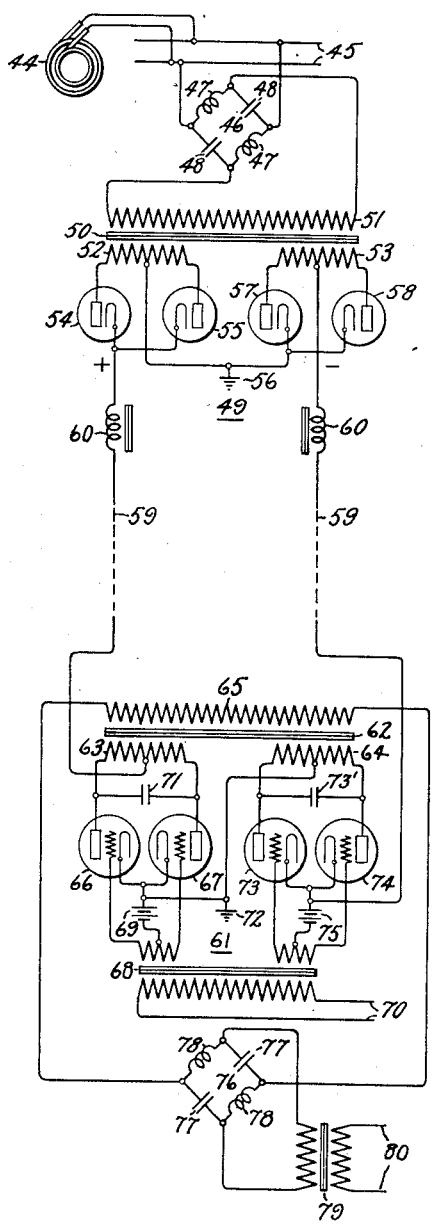

Referring now to Fig. 1 of the drawings, I have illustrated apparatus comprising a prime mover 10, an alternating current generator 11 connected to be operated thereby and an alternating current bus 12 connected to be energized from the generator 11. The generator 11 is provided with the usual excitation circuit indicated by the source of current 13 which is connected to energize a field winding 14 through an adjustable resistance 15. So far as my invention is concerned, the foregoing apparatus described is merely illustrative of any suitable source of constant voltage alternating current which may include one or a plurality of alternating current generators. In carrying out my invention I convert the constant voltage alternating current to direct current of constant value. In accordance with the illustrated arrangement I first derive an alternating current of constant value from the source of alternating current of constant voltage 11 by means of certain combinations of reactances of opposite sign, such for example as capacitors and inductors. Although there are various known methods of transforming from constant voltage to constant current by the constant current transformer or by recombinations of inductive and capacitive reactances, the illustrated combination 16, known in the art as the monocyclic square and comprising four equal reactances, two capacitors 17 and two inductors 18, arranged alternately in the form of a square, is a desirable arrangement for single phase circuits since the current regulation is closer and the efficiency higher than many of the other known arrangements of the same type. The constant potential alternating current circuit is connected to two diagonally opposite points of the square and the conjugate points of the square are connected to supply the alternating current of constant value. The constant current output from the square 16 is rectified for the series transmission circuit by a rectifier arrangement 19. The rectifier 19 comprises a transformer 20 and a pair of electric discharge devices 21 and 22 connected in a well known manner to provide full wave rectification. The electric discharge devices 21 and 22 are each provided with an anode and a cathode and may be any of the several types known in the art, although I prefer to use discharge devices of the vapor or gaseous type.

Although I have described an arrangement in which alternating current of constant voltage is first transformed into an alternating current of constant value, it will occur to those skilled in the art that the alternating current of constant potential may be first rectified and a grid controlled rectifier employed for maintaining constant current in the transmission circuit in a known manner without departing from my invention in its broader aspects.

The direct current terminals of the rectifier 19 are connected to a transmission circuit 23 which may be arranged in any fashion most suitable from the point of view of the territory to be covered and the location of the various consumers. The circuit 23 may be arranged as an overhead line or it may be a single conductor cable arranged underground in any suitable fashion. A particular arrangement which is now contemplated is what is known in the art as an open loop circuit comprising a single conductor cable buried in the ground to a suitable depth such that the cable is not interfered with by the usual working of rural land, and running out from and returning to the rectifier station in such a manner as to come as close as possible to the respective consumers in a given area.

Interposed between the alternating current bus 12 and the input terminals of the monocyclic square 16 is a circuit interrupting device 24 provided with a tripping mechanism 25 connected to be energized in accordance with the current in circuit 23 through a current shunt 26 in a manner to cause the interrupting device 24 to be opened in the event of an open circuit in the circuit 23. A reactor 27 is connected in series relation with the circuit 23 to act as a smoothing reactor.

To supply electric service to the consumers I provide individual equipments for each consumer. These individual equipments will receive the series constant direct current and will invert this direct current into constant voltage alternating current. The various inverting stations are indicated by the letters A to G, inclusive. Only one inverting station, namely station A, will be described in detail since the apparatus in the remaining stations each of which is represented by the square outline with input and output terminals similar to station A, are intended to be duplicate apparatus to that contained in station A for the purpose of illustrating this embodiment of my invention. It will, of course, be obvious that the details of the respective inverting service stations need not be duplicates since it will occur to those skilled in the art that various other known types of electric valve inverters with other arrangements of grid control, and other known arrangements of transforming from alternating current of constant value to constant potential alternating current may be used in one or more of the other inverting stations without departing from my invention in its broader aspects.

The inverting station A, and similarly the other stations B to G, inclusive, is connected in series relation with the transmission circuit 23 through a disconnect switch 28. Each station is also provided with a short-circuiting switch 29 in case it is desired to remove the associated inverting station from the series circuit. The apparatus for converting the constant direct current of the circuit 23 to alternating current of constant value may be any of the several types well known in the art and I have illustrated, by way of example, an apparatus similar to that disclosed and claimed in United States Letters Patent No. 1,800,002, granted April 7, 1931 upon an application of E. F. W. Alexanderson. The inverting arrangement as illustrated comprises a pair of electric valves 30 and 31 connected to the primary winding of a transformer 32 for inverting the constant direct current to alternating current of constant value. The valves 30 and 31 are preferably of the vapor electric type and are each provided with an anode, a cathode and a control electrode or grid which is connected to the common cathode circuit of these valves through opposite halves of the secondary winding of a grid transformer 33 and a current limiting resistor 34. The primary winding of the grid transformer 33 is energized from some portion of the alternating current circuit of the apparatus, for example, a tertiary winding 35 of the transformer 32. A capacitor 36 is connected between the anodes of the valves 30 and 31 to commutate the current between these valves and a capacitor 37 is connected in series with the primary winding of the grid transformer 33 to determine the frequency of the inverted alternating current. The constant alternating current traversing the secondary winding of transformer 32 is transformed to alternating current of constant potential by any suitable means, which, for example, as illustrated comprises a monocyclic square having two capacitors 38 and two inductors 39 arranged alternately in the form of a square. The output terminals of the square are connected to the primary winding of a transformer 40 having a ratio of transformation suitable for consumer use. By way of example, I have illustrated a transformer having a secondary winding arranged to feed a three-wire distribution circuit 41 which may be of the 120/240 distribution type. As a protective feature it is advisable to furnish a film-cutout 42 across the secondary of the transformer 40 in order to protect the consumer's equipment in case of abnormal conditions on his circuit. It is also convenient to interpose a circuit interrupting device 43 between the output terminals of transformer 40 and the distribution circuit 41.

The general principles of operation of the converting and transforming apparatus referred to in the above described system will be understood by those skilled in the art and it may be briefly summarized as follows: The alternating current delivered to the bus 12 is transformed to alternating current of constant value by the monocyclic square 16, rectified by the rectifier 19 and delivered to the series circuit 23 as direct current of constant value. Direct current of constant value is transmitted to each of the inverting stations A to G, inclusive, and distributed as alternating current of constant voltage over the respective distribution circuits. A detailed explanation of the operation of the inverting apparatus may be found in the above-mentioned Patent No. 1,800,002. Briefly stated, the direct current is inverted into alternating current by means of the electric valves 30 and 31 and their associated grid circuits, the secondary winding of transformer 32, and the commutating capacitor 36. Assuming that the valve 30 is initially made conducting, current will flow from the direct current line through the left-hand portion of the primary winding of transformer 32, through the valve 30 to the circuit 23. As the direct current is building up in this portion of the primary winding of transformer 32, a still more negative potential will be induced at the right-hand terminal of the primary winding, the potential being approximately twice that of the left-hand portion. When the valve 31 is made conducting, the capacitor 36, which has been charged to twice the potential impressed across valve 30, is short circuited through the valves 30 and 31 in series and tends to send a current in the reverse direction through the valve 30, thus completely interrupting the current in valve 30. Before the capacitor 36 becomes completely discharged, the grid of the valve 30 has become negative and maintains this valve non-conductive during the next half cycle. In this manner the current is successively transferred between the valves 30 and 31 and an alternating current is delivered to the transformer 32. The capacitor 36 serves to commutate the current between the valves while capacitor 37 serves to determine the natural frequency of oscillation of the circuit, that is, the frequency of the current delivered to the transformer 32. This latter function may also be performed by the capacitor 36. The monocyclic square comprising the capacitors 38 and inductors 39 adjusted for a state of resonance, transforms the alternating current of constant value to alternating current of constant voltage in a manner well understood in the art. The alternating current of constant voltage is then delivered to the distribution circuit 41 through the transformer 40.

The operation of the system as a whole under the various conditions likely to be encountered in practice will be briefly considered. With the system described above it is to be noted that in case of trouble or fault conditions on any particular consumer's circuit, such as a ground, a short circuit, or an open circuit, there would be no interference from this cause with the other consumers on the circuit. In case any of the equipment at the sending end should develop a fault full protection may be afforded by the circuit interrupter 24 which connects the system to the supply bus. If a wire or cable of the series circuit should break, thus opening the circuit, the no load tripping mechanism 25 is arranged to trip the circuit interrupter 24, thus isolating the circuit. Unlike any other system, a short circuit between two conductors as they leave the rectifier station 19, means a reduction in load instead of an increase in load. Since the rectifier is adjusted for constant current variable voltage, the voltage would immediately drop to that voltage necessary to force the current at constant value through the short circuit. Consequently, the damage to any apparatus would be limited.

In Fig. 2 of the drawings I have shown another embodiment of my invention which is particularly adapted to a system of transmission which, as previously mentioned, may appropriately be designated as point-to-point transmission. The general features of the system are very similar to the system shown in Fig. 1 in that I convert constant voltage alternating current to alternating current of constant value, rectify this current and transmit at constant value direct current, invert the constant direct current to alternating current of constant value and finally transform the constant value alternating current to constant voltage alternating current for utilization purposes. I have illustrated a source of alternating current 44 which may be one or a number of constant voltage alternating current generating means connected to energize a generator bus 45. The constant voltage alternating current from bus 45 is transformed to alternating current of constant value by means of a monocyclic square 46 comprising two capacitors 48 and two inductors 47 arranged alternately in the form of a square. Although at the present time I find it desirable to use this particular type of constant voltage—constant current transforming means for single phase circuits, it is to be understood that other transforming means of this type suitable for polyphase circuits may be used without departing from my invention in its broader aspects. The input terminals of the monocyclic square 46 are connected to the bus 45. The constant current output terminals of the square 46 are connected to a rectifier arrangement 49. For the transmission of power in relatively large amounts and at relatively high voltages I prefer to use rectifying means in each side of the circuit. The rectifier 49 as illustrated comprises a transformer 50 having a primary winding 51 and two secondary windings 52 and 53. The secondary winding 52 is connected with its outer terminals to a pair of electric discharge devices or tubes 54 and 55 which are arranged in a well known manner to provide full wave rectification. This group of tubes is arranged to furnish, for example, 200 amperes constant direct current at 15,000 volts positive, with the electrical midpoint of the secondary winding 52 grounded as indicated at 56 and the cathode connection of the valves furnishing the positive side of the transmission circuit. Similarly, the outer terminals of the secondary winding 53 are connected to another pair of electric discharge devices 57 and 58 which are arranged in a well known manner to provide full wave rectification. This group of tubes is also arranged to furnish, for example, 200 amperes constant direct current at 15,000 volts negative with the electrical midpoint of the secondary winding connected to the negative side of the transmission circuit and the cathode side of the tubes connected to a conductor connection of the tubes connected to a conductor having a potential intermediate the potential of the outside conductors of the transmission circuit and shown as the ground 56. With the values of current and voltage assumed merely by way of example there is obtained a transmission circuit of 200 amperes at 30,000 volts, or 6000 kilowatts. The transmission circuit is indicated by the conductors 59 which are shown dotted over a portion of their length progressing toward the receiving station to indicate distance. Smoothing reactors 60 are connected in each side of the transmission circuit. The tubes 54 and 55, and 57 and 58 are each provided with an anode and a cathode and may be any of the several types well known in the art, although I prefer to use tubes of the vapor or gaseous type and in the particular arrangement illustrated two electrode tubes. If the constant direct current is obtained without the use of a transforming device of the monocyclic square or similar type, one may then use known types of tubes equipped with a control electrode or grid so as to maintain constant current on the transmission circuit in a well known manner without departing from my invention in its broader aspects.

The inverter receiving station 61 is similar in equipment to the rectifying station 49 except that the tubes are equipped with control electrodes or grids and are arranged for inverting from constant direct current to constant alternating current. For simplicity in explaining this embodiment of my invention, I have shown the same general type of inverter as that shown in the illustrated embodiment of Fig. 1 except for the special arrangement of inverters for each side of the circuit and another form of frequency determining means for the distribution circuit. As illustrated, I provide a transformer 62 having a primary winding arranged in two separate sections, 63 and 64, respectively, and a secondary winding 65. A pair of electric valves 66 and 67 are connected to the outer terminals of the primary winding 63 for inverting the constant direct current to alternating current of constant value. The valves 66 and 67 are preferably of the vapor electric type and are each provided with an anode, a cathode, and a control electrode or grid which is connected to the common cathode circuit of these valves through opposite halves of a secondary winding of a grid transformer 68 and a negative bias battery 69. The primary winding of the grid transformer 68 may be energized from any suitable alternating current circuit 70 of the frequency which it is desired to supply to the circuit energized from transformer winding 65. A commutating capacitor 71 is connected between the anodes of the valves. The positive side of the direct current circuit 59 is connected to the electrical midpoint of primary winding 63 while the common cathode circuit of this group of valves is grounded at 72. Similarly, another pair of electric valves 73 and 74 are connected to the outer terminals of the primary winding 64 for converting the constant direct current to alternating current of constant value. Each of these valves is also preferably of the three electrode vapor electric type with a grid which is connected to the common cathode circuit thereof through opposite halves of another secondary winding of grid transformer 68 and a negative bias battery 75. A commutating capacitor 73' is connected between the anodes of the valves. The electrical midpoint of primary winding 64 is connected to the ground 72 while the common cathode circuit of the valves 73 and 74 is connected in the negative side of the transmission circuit 59.

The constant value alternating current output from the transformer winding 65 is transformed to constant voltage alternating current by means of a monocyclic square 76 comprising two capacitors 77 and two inductors 78 arranged alternately in the form of a square with the input terminals connected to transformer winding 65 and the output terminals connected to a transformer 79 for changing the alternating voltage from the monocyclic square to any value suitable for a receiving circuit 80.

The general principles of operation of the arrangement illustrated in Fig. 2 will be substantially the same as the arrangement illustrated in Fig. 1. The constant voltage alternating current from the source 44 is transformed by the monocyclic square 46 to alternating current of constant value. By means of the respective groups of rectifiers comprising the tubes 54 and 55 and 57 and 58 constant direct current at double the voltage of the separate groups of valves is delivered to the transmission circuit. The power delivered at the receiving station is inverted in accordance with the operating principles described in connection with Fig. 1 by each group of inverters comprising tubes 66 and 67 and 73 and 74 to provide alternating current of constant value in transformer winding 65. The monocyclic square 76 transforms the alternating current of constant value to constant voltage alternating current for use in the receiver circuit 80.

In the arrangement as illustrated in Fig. 2 it is to be noted that unlike other systems proposed or used heretofore, it readily adapts itself to a growing load or increased power transmitting capabilities with a relatively small expenditure of money. For example, a duplicate set of rectifiers and inverters could be installed and connected in series with those described, thus doubling the line voltage and thereby doubling the kilowatt rating of the line. Furthermore, as the technic of tube manufacture advances and tubes are available which may be operated at higher and higher voltages, the tubes of the original installation may be replaced and the system operated with the same number of tubes but with a kilowatt rating increased proportionally to the increase afforded by the higher voltage tubes.

Unlike the high voltage alternating current system, the present system is inherently stable, and is not subject to major disturbances caused by short circuits and suddenly applied load. In the transmission circuit of constant current the switching problem is reduced to one of short-circuiting rather than one of open-circuiting making it possible to use knife blade switches which are relatively cheap as compared to large and expensive oil-circuit breakers. In the event of a lightning disturbance caused either by a direct stroke or an induced stroke, the current is limited in my system and greater protection and less destruction of apparatus is obtained than with the alternating current system.

Although the arrangement as illustrated in Fig. 2 has been described as a point-to-point system particularly adapted for bulk transmission of power, it will be apparent that the series transmission circuit may be tapped at any point with a loop circuit or any other suitable circuit, in accordance with the arrangement illustrated in Fig. 1, without endangering the service of the main transmission line itself, since the tap would be a series tap and, as the current is limited in case of trouble at the local tap, a short-circuiting switch could be closed and the line could be continued in operation. Furthermore, it will be apparent that other generating sources of constant direct current, for example, similar to the illustrated generating station, 44—46—49, may be connected in series relation with the transmission circuit 59 of Fig. 2 at any convenient point along the line in the event that it is desired to use power sources along the right of way, or to purchase power from bordering systems, or to increase the voltage of the circuit at distant points from the principal source or sources.

Although the various alternating current circuits have been illustrated as single phase circuits for simplifying the description of my invention, it will occur to those skilled in the art that various polyphase circuit arrangements may be substituted for the single phase circuits particularly in the rectifying and inverting stations to obtain better economy and improved operating conditions without departing from my invention in its broader aspects.

While I have shown and described several embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States, is:

1. The combination of a source of constant voltage alternating current, means for transforming said constant voltage alternating current to alternating current of constant value, means for converting the alternating current of constant value to direct current of constant value, means for inverting said direct current of constant value to alternating current of constant value, and means for transforming said alternating current of constant value to alternating current of constant voltage.

2. The combination of a source of constant voltage alternating current, means including a network of reactances of opposite sign for transforming said constant voltage alternating current to alternating current of constant value, means including an electric discharge device for converting the alternating current of constant value to direct current of constant value, means including an electric discharge device for inverting said direct current of constant value to alternating current of constant value, and means including a network of reactances of opposite sign for transforming said alternating current of constant value to alternating current of constant voltage.

3. In a system for transmitting electric energy, a transmission circuit, means for supplying to said transmission circuit direct current of constant value, and means connected to said transmission circuit for deriving therefrom an alternating current of constant value and for transforming said alternating current of constant value to alternating current of constant voltage.

4. The combination in a system for transmitting electric energy, of means including electric discharge apparatus in the supply end of the system for producing constant direct current from a source of constant voltage alternating current, and means including electric discharge apparatus at a receiving point in said system for producing constant voltage alternating current from said constant direct current.

5. In combination, a constant direct current circuit, an inverter apparatus having an input circuit connected in series relation with said direct current circuit for changing constant direct current to alternating current of contsant value, and means for transforming said alternating current of constant value to constant voltage alternating current.

6. In combination, a constant direct current circuit, means including an electric valve inverter having an input circuit connected in series relation with said direct current circuit for changing constant direct current to alternating current of constant value, and a network of reactances of opposite sign connected to the output circuit of said inverting means for transforming the alternating current of constant value to constant voltage alternating current.

7. In a system of transmitting electric energy, a transmission circuit, means including electric discharge apparatus for energizing said transmission circuit with direct current of constant value, means connected in series relation with said transmission circuit including electric discharge apparatus for deriving from said transmission circuit alternating current of constant value, and means including a network of reactances of opposite sign for transforming said alternating current of constant value to alternating current of constant voltage.

8. In a system of electric distribution, a source of alternating current of constant voltage, means for transforming said alternating current of constant voltage to alternating current of constant value, means for converting said alternating current of constant value to direct current of constant value, a plurality of independent widely separated consumption circuits, a transmission circuit connected to said converting means for energizing said consumption circuits, inverting means for each of said consumption circuits connected in series relation with said transmission circuit near each of said consumption circuits for transforming the direct current of constant value to alternating current of constant value, and means interposed between each of said inverting means and the consumption circuit to be served thereby for energizing said consumption circuit with alternating current of constant voltage.

9. In a system of electric distribution, a source of alternating current of constant voltage, means including a plurality of reactances of opposite sign for transforming said alternating current of constant voltage to alternating current of constant value, means including electric discharge apparatus for converting said alternating current of constant value to direct current of constant value, a plurality of independent widely separated consumption circuits, a transmission circuit comprising a loop conductor leading out from and returning to said converting means so as to approach relatively closely each of said consumption circuits, inverting means including electric discharge apparatus for each of said consumption circuits connected in series relation with said loop conductor near each of said consumption circuits, and means including a plurality of reactances of opposite sign interposed between each of said inverting means and the consumption circuit to be served thereby for energizing said consumption circuit with alternating current of constant voltage.

10. In a system of electric power transmission, a source of alternating current of constant voltage, means for transforming said alternating current of constant voltage to alternating current of constant value, a transmission circuit, and rectifying means interposed between said transforming means and said transmission circuit for energizing said transmission circuit with constant direct current, said rectifying means comprising a plurality of groups of electric valves connected in series relation with said transmission circuit, the neutral point of said groups of valves being connected to a conductor having a potential intermediate the potential of the outside conductors of said transmission circuit.

11. In a system of electric power transmission, a source of alternating current of constant voltage, means including reactances of opposite sign for transforming said alternating current of constant voltage to alternating current of constant value, and rectifying means interposed between said first mentioned means and said transmission circuit for energizing said transmission circuit with constant direct current, said rectifying means comprising two groups of electric valves connected in series relation with said transmission circuit, each group of valves being arranged for full wave rectification, the neutral point of interconnection between said groups of valves being connected to ground.

12. In a system of electric power transmission, a source of alternating current of constant voltage, means for transforming said alternating current of constant voltage to alternating current of constant value, a transmission circuit, rectifying means interposed between said transforming means and said transmission circuit for energizing said transmission circuit with constant direct current, an inverter connected to said transmission circuit for changing constant direct current thereof to constant alternating current, said inverter comprising a plurality of groups of electric valves connected in series relation with said transmission circuit, the neutral point of said groups of valves being connected to a conductor having a potential intermediate the potential of the outside conductors of said transmission circuit, and transforming means for changing the constant alternating current of said inverter to constant voltage alternating current.

13. In a system of electric power transmission, a source of alternating current of constant voltage, means including reactances of opposite sign for transforming said alternating current of constant voltage to alternating current of constant value, a transmission circuit, rectifying means interposed between said first mentioned means and said transmission circuit for energizing said transmission circuit with constant direct current, an inverter connected to said transmission circuit for changing constant direct current thereof to constant alternating current, said inverter comprising two groups of electric valves connected in series relation with said transmission circuit, the neutral point of interconnection between said groups of valves being connected to ground, and means including reactances of opposite sign for changing the constant alternating current of said inverter to constant voltage alternating current.

14. In a system of electric power transmission, a transmission circuit, means connected in series relation with said transmission circuit for supplying constant direct current thereto, an inverter connected to said transmission circuit for changing constant direct current to constant alternating current, said inverter comprising a plurality of groups of electric valves connected in series relation with said transmission circuit, the neutral point of said groups of valves being connected to a conductor having a potential intermediate the potential of the outside conductors of said transmission circuit, and transforming means for changing the constant alternating current of said inverter to constant voltage alternating current.

15. The combination of a source of constant voltage alternating current, means for changing said constant voltage alternating current to constant direct current, a circuit interrupter interposed between said source and said means, a transmission circuit connected to be energized by said constant direct current, and means operative in accordance with current below a predetermined value in said transmission circuit for opening said circuit interrupter.

16. The combination of source of constant voltage alternating current, means including reactances of opposite sign for changing said constant voltage alternating current to alternating current of constant value, a circuit interrupter interposed between said source and said monocyclic square, means including an electric valve rectifier for converting said constant alternating current to constant direct current, a transmission circuit connected to be energized from said rectifier, and means responsive to an interruption of said transmission circuit for opening said circuit interrupter.

17. In a system of electrical distribution, a transmission circuit connected to be energized with constant direct current, a plurality of independent consumption circuits, a plurality of inverting means connected in series relation with said transmission circuit and arranged with one of said inverters near each of said consumption circuits for inverting the direct current of constant value to alternating current of constant value, short-circuiting means provided for each of said inverting means, means connected to each inverter for transforming said alternating current of constant value to alternating current of constant voltage, and means connected to each of said consumption circuits for short-circuiting said consumption circuit in the event of a fault thereon.

18. In a system of electrical distribution, a transmission circuit connected to be energized with constant direct current, a plurality of independent consumption circuits, a plurality of electric valve inverting means connected in series relation with said transmission circuit and arranged with one of said inverting means near each of said consumption circuits for inverting the direct current of constant value to alternating current of constant value, a short-circuiting switch connected across each of said inverting means for taking the associated inverting means out of service, means connected to each inverter for transforming said alternating current of constant value to alternating current of constant voltage, and means connected to each of said consumption circuits and responsive to voltage in excess of a predetermined value on said consumption circuit for short-circuiting the associated consumption circuit.

19. In a system of electric distribution, a source of alternating current of constant voltage, means including a monocyclic square for transforming said alternating current of constant voltage to alternating current of constant value, a circuit interrupting device interposed between said source and said monocyclic square, rectifying means including electric discharge apparatus connected to the output circuit of said monocyclic square, a plurality of independent widely separated consumption circuits, a transmission circuit comprising an open loop series type circuit, means responsive to an interruption of said series loop circuit for opening said circuit interrupter, inverting means including electric valves for each of said consumption circuits connected in series relation with said loop circuit near each consumption circuit, a short-circuiting switch connected across each inverting means for taking the associated inverting means out of service, means including a monocyclic square interposed between each of said inverting means and the consumption circuit to be served thereby for energizing said consumption circuit with alternating current of constant voltage, and means connected to each of said consumption circuits and responsive to voltage in excess of a predetermined value on said consumption circuit for short-circuiting the associated consumption circuit.

CHARLES W. STONE.